United States Patent Office 3,736,357
Patented May 29, 1973

3,736,357
HIGH MOLECULAR WEIGHT MANNICH CONDENSATION PRODUCTS FROM TWO DIFFERENT ALKYL-SUBSTITUTED HYDROXYAROMATIC COMPOUNDS
Edmund J. Piasek, Chicago, Ill., and Robert E. Karll, Munster, Ind., assignors to Standard Oil Company, Chicago, Ill.
No Drawing. Continuation-in-part of application Ser. No. 502,368, Oct. 22, 1965, now Patent No. 3,539,633, dated Nov. 10, 1970. This application Apr. 14, 1969, Ser. No. 816,124
Int. Cl. C07c 91/28
U.S. Cl. 260—570.5 P                5 Claims

ABSTRACT OF THE DISCLOSURE

Products of the condensation of (1) a high molecular weight alkyl - substituted hydroxyaromatic compound whose alkyl substitutuent has upward from 40 to 20,000 carbon atoms, (2) a lower molecular weight alkyl-substituted phenol whose alkyl-substituent has 2 to 20 carbon atoms, (3) an amine having two primary amino (—$NH_2$) groups and (4) an aldehyde in the respective molar ratio of reactants of 2.0:0.7–1.0:1.4–2.0:2.8–4.0, are novel ashless-type (metal free) mineral-oil soluble addition agents having dispersant detergent and anti-oxidant functions affording anti-sludge and anti-varnish deposition and corrosion inhibition in crankcase lubricating compositions subjected to low or high temperature in-service use. Such condensation products are prepared either by single step reaction conducted by subjecting all four of the reactants in the stated molar ratio of reactants to a single condensation reaction under known Mannich condensation reaction conditions or by a two step reaction wherein reactants (1), (3) and (4) are first subjected to Mannich condensation conditions in the respective molar ratio of 2:1.4–2.0:1.4–2.0 and the resulting first step product is further condensed with reactants (2) and (4) used in the respective molar ratio of 0.7–1.0:1.4–2.0.

RELATED APPLICATIONS

This application is a continuation-in-part of our copending application Ser. No. 502,368, filed Oct. 22, 1965 now U.S. Pat. No. 3,539,633. Our copending application Ser. No. 816,125, filed Apr. 14, 1969 discloses and claims boron-containing derivatives and their oil solutions of the present inventive high molecular weight Mannich condensation products from two different alkyl-substituted hydroxyaromatic compounds.

BACKGROUND OF THE INVENTION

Present-day automobile and diesel engines have been designed for higher-power output, lower combustion products emission and longer in service periods of use of crankcase lubricating oils. All of these design changes have necessitated devising higher efficiency lubricating oils that will under the increased severity of in service use afford protection against corrosion of and deposition of sludge and varnish on engine parts which otherwise tend to accelerate decrease in both operating efficiency and life of the engine. The principle ingredient of crankcase lubricants is lubricating oil, a mixture of hydrocarbons derived from petroleum. There is a limit to which those hydrocarbon oils per se can be improved, e.g. removal of polymerizable components, acidic or acid forming components, waxes and other low temperature solids formers, and other deleterious components. A lubricant base oil refined even to the optimum still requires certain oil-soluble chemical addition agents to resist oxidation of the oil, deposition of sludge and varnish on metal parts and corrosion of metal parts and to provide added lubricity and regulated viscosity change from low to high temperatures. No one chemical addition agent has been found that provides all those extra functions.

Combustion products from the burning of fuel, lubricating oil and nitrogen of air as well as products of thermal degradation of hydrocarbon lubricating oils and addition agents tend to concentrate in the crankcase oil. Those products of combustion and thermal degradation tend to form oil-insoluble products that either surface coat metal parts (lacquer or varnish like films) or settle out as viscous (sludge) deposits or form solid ash-like or carbonaceous deposits. Any of these deposits can restrict and even plug grooves, channels and holes provided for lubricant flow to moving surfaces requiring lubrication. Crankcase oils are formulated (dissolving of addition agents in highly refined hydrocarbon lubricating oils) not only to reduce thermal decomposition of oil solvent and addition agent solutes but also to keep in suspension (as a dispersant) or to resuspend (as a detergent) insoluble combustion and thermal degradation products as well as neutralize acidic products. Neutral and over-based metallo-organic compounds such as the alkaline earth metal salts of sulfonic acids and hydrocarbon-$P_2S_5$ reaction products were first used as dispersant-detergent addition agents. Their in service drawbacks were that their combustion and/or thermal degradation products left metal ash solids, they could not efficiently resuspend or disperse lacquer and varnish formers or sludge formers to meet present day engine requirements and they lost their dispersant-detergent function when their alkaline earth metal component had been consumed by neutralizing acidic products of combustion.

Thus as the periods of in service use of crankcase oils were lengthened, lengthening of periods between oil drains for both automobile engines and railway diesel engines, more efficient dispersancy and detergency performance, acid neutralization and a lower ash-forming tendency were needed for chemical addition agents used in lubricating oils. Many researchers have recently expended much effort directed to this problem. One new approach taken by researchers in different laboratories was to devise amine derivatives, e.g. salts, amides, imides and amidines of polycarboxylic acids that would function as dispersant-detergent addition agents. Others devised polymeric compounds having pendent or grafted-on pendent polar groups that provided the dispersant-detergent function. Still others devised for that dispersant-detergent function combinations of alkaline earth metal sulfonates and Mannich condensation products of a low molecular weight alkyl-substituted ($C_2$ to $C_{20}$) hydroxyaromatic compound, an amine having at least one replaceable hydrogen on a nitrogen and an aldehyde or alkaline earth metal salts (phenates) of those Mannich condensation products. Those combinations did not overcome the formation of metal-ash nor were they particularly suitable for the increased dispersancy-detergency service for long drain service of present day engine requirements even though the combination offered some anti-oxidation activity.

The present invention is directed to ashless type high molecular weight Mannich condensation products derived from high molecular weight alkylated hydroxyaromatic compounds. Mannich condensation products derived from alkyl-substituted hydroxyaromatic compounds having relatively low molecular weight alkyl substituents, i.e. 4 to 20 carbon atoms in the alkyl hydrocarbon substituent and chlorinated wax (straight chain) type alkyl-substituents are known from prior U.S. Pats. such as No. 2,403,453, No. 2,353,491, No. 2,459,112, No. 2,984,550 and No. 3,036,003. However, those prior Mannich condensation products are not particularly suitable as highly efficient dispersant-detergent addition agents for the present-day long drain oil interval in service use.

The Mannich condensation products closest to those of the present invention are those illustrated below. The simplest Mannich condensation products can be illustrated from the reaction of an alkyl phenol, an N,N-disubstituted amine and formaldehyde according to the following equation:

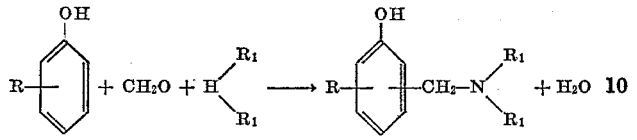

wherein R is a $C_2$ to $C_{20}$ alkyl group or chlorinated wax straight chain alkyl group and $R_1$ is alkyl and/or aryl hydrocarbon groups.

Prior Mannich condensation products also are those obtained by reacting $C_4$ to $C_{20}$ alkylphenols, formaldehyde and a diamino alkane in the ratio of two moles of said alkylphenol and two moles formaldehyde for each mole of diamino alkane of the formula $H_2N$—$R'$—$NH_2$ where $R'$ is a divalent alkylene hydrocarbon. Such products have been illustrated in the prior art by the following structural formula:

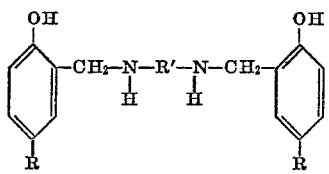

where $R'$ is divalent alkylene hydrocarbon and R is a $C_4$ to $C_{20}$ alkyl hydrocarbon group.

Still other prior Mannich condensation products are those resulting from the reaction of from 0.5 to 2 moles each of $C_4$ to $C_{20}$ alkyl phenol and formaldehyde for each basic nitrogen in an alkylene polyamine also named azaalkylene diamines. Said alkylene polyamines are those having the formula

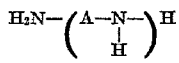

where A is a divalent alkylene of 2 to 6 carbon atoms and $n$ is an integer of from 1 to 10. The alkylene polyamines usually used are the di-, tri- and tetra-ethylene, tri-, tetra- and petamines, that is A is —$CH_2CH_2$— and $n$ is 2, 3 and 4. The resulting products are illustrated in U.S. Pat. 3,036,003. For example the reaction of 3 moles each of p-tertiary octyl phenol and formaldehyde with one mole of diethylene triamine is illustrated as $N_1$, $N_2$, $N_3$-tri - (2 - hydroxy-5-t.-octylbenzyl) diethylene triamine; the reaction of 2 moles each of p-t.5octyl phenol and one mole diethylenetriamine is illustrated as being either $N_1$, $N_3$-di-(2-hydroxy-5-t.-octylbenzyl) or $N_1$, $N_2$-di-(2-hydroxy-5-t.-octylbenzyl) diethylene triamine. It would appear from the reference that the reactants used for the preparation of those Mannich condensation products react equally with either the primary amino (—$NH_2$) group or the secondary amino (—NH—) group whose nitrogen is part of the azaalkylene amine chain substantially without preference.

Certain of the hydroxy- $C_2$ to $C_{20}$ alkyl benzyl substituted alkylene polyamines are disclosed by U.S. Pat. 3,036,003 as useful per se in lubricant oil formulations as ashless-type detergents. For example the tetra-(hydroxy-5-tertiary-octyl-benzyl) substituted product resulting from the molar ratio reaction of 4 moles p-t.octyl phenol, 4 moles formaldehyde and one mole tetraethylene pentamine did, in the carbon black suspension test reported in that patent, keep all the carbon black suspended in a solvent comprising a mixture of kerosene and a mineral oil. However, that patent demonstrates by an oxidation stability test that the same tetra-(hydroxy-t.octyl-benzyl) substituted tetraethylene pentamine alone (no other detergent) promoted sludge and varnish formation as well as oxidation of the base oil solvent. Thus U.S. Pat. No. 3,036,003 demonstrates its Mannich condensation products when used alone in oil to be of little value as the sole dispersant or detergent.

Mannich condensation products of the above prior art are prepared by reacting the alkylphenol, lower aliphatic aldehyde such as formaldehyde, paraformaldehyde or acetaldehyde, and amine, diaminoalkane, diaminoarane or alkylene polyamine at 100 to 350° F. in the absence or presence of a solvent. When a solvent is used, benzene, toluene, xylene and others easily removed from the condensation product are useful as are light mineral oil such as those used in blending stocks to prepare lubricant oil formulations as well as mixtures of these two types of solvents. Since water is formed as a by-product, drying of the reaction mixture is accomplished by employing a reaction temperature sufficiently high, at least during the last part of the process, to drive off water alone, or as an azeotropic mixture with the aromatic solvent, or to drive off water by the aid of an inert stripping gas such as nitrogen, carbon dioxide, etc.

Also the prior art type Mannich condensation products were mainly used as lubricant addition agents in the form of their exactly neutralized or highly basic (or over-based) alkaline earth metal salts (alkaline earth metal phenate derivatives) to provide a combination of detergent-inhibitor properties in one additive agent. The exactly neutralized alkaline earth metal salts have one equivalent of alkaline earth metal for each hydroxy group present. The highly basic or over-based alkaline earth metal salts have for each hydroxy group present more than one equivalent of alkaline earth metal in the form of a hydroxy metaloxy, alkoxy metaloxy or even alkaline earth metal carbonate complex with hydroxy metaloxy on each benzene ring as a replacement for the phenol hydroxy group.

SUMMARY OF THE INVENTION

Our invention is predicated upon the following discoveries that:

(a) novel high molecular weight Mannich condensation products which are soluble in mineral oils of the lubricating type can be prepared from the reactants (1) a high molecular weight alkyl-substituted hydroxy-alkyl aromatic compound whose alkyl-substituent has upward from 40 to 20,000 carbon atoms, (2) a lower molecular weight alkyl-substituted phenol whose alkyl-substituent has 2 to 20 carbon atoms, (3) an amine having two primary amino (—$NH_2$) groups and (4) an aldehyde when those reactants are used in the respective molar ratio of 2.0:0.7–1.0:1.4–2.0:2.8–4.0;

(b) those novel high molecular weight reactants can be prepared either by a single reaction wherein all of the four reactants (1), (2), (3) and (4) in amounts to supply them in said respective molar ratio are subjected to known Mannich condensation conditions or by a two step condensation in which reactants (1), (3) and (4) in the respective molar ratio of 1.0:0.7–1.0:0.7–1.0 are first subjected to known Mannich condensation conditions and then two moles of the first step product are condensed at a temperature above 250° F., desirably 280 to 320° F. and preferably 290 to 310° F. with 0.7–1.0 mole reactant (2) and 1.4 to 2.0 mole of reactant (4);

(c) those novel high molecular weight Mannich condensation products when present in solute concentrations of 0.05 to 70 weight percent in mineral oil solvent of the lubricating oil types provides solutions useful as crankcase lubricating oil compositions or useful to prepare crankcase lubricating oil compositions and crankcase oil fortifying compositions because such solutes possess detergency, dispersancy and anti-oxidation properties; and (d) such solutions of the novel high molecular weight Mannich condensation products provide the protection afforded by their detergency, dispersancy and anti-oxidation properties to crankcase lubricating compositions subjected to high temperature in-service use operation as well as low temperatures in-service use operation.

In general, the high molecular weight Mannich condensation products of this invention whether prepared by the one step condensation or by the two condensation steps mentioned above are not simple single chemical compounds but rather are mixtures of high molecular weight condensation products. But, the products of the two condensation steps have, we believe, a predominant amount of the tail-to-head-to-tail products hereinafter illustrated by structural formula in admixture with other condensation products of equal high molecular weight having strucutres differing from those structures illustrated. It is not necessary for either the preparation or use of the novel high molecular weight condensation products of this invention to establish with certainty the precise structures of the compounds in the various mixtures of compounds resulting from the one step or two step condensations.

It is preferred for the preparation of the present inventive high molecular weight Mannich condensation products to use as reactant (1) mono-high molecular weight $C_{40}$ to $C_{20,000}$ alkyl-substituted phenols. Desirably such alkyl-substitued phenols whose alkyl groups have molecular weights in the range of 600 to 3000 and preferably in the range of 800 to 2500 (those molecular weights being understood as number average molecular weights for the alkyl-substituents) are those of particular choice.

For the purposes of this invention any aldehyde which is aliphatic or aromatic per se or in nature will provide the necessary methylene or substituent methylene bridge between a nitrogen of the amine reactant and a carbon of the aromatic ring of the hydroxyaromatic reactants (1) and (2). But it is preferred to prepare the present inventive novel high molecular weight Mannich condensation products by the use of a formaldehyde affording reactant such as formaldehyde, Formalin paraformaldehyde, trioxymethylene and the like.

We believe the use of the lower $C_2$ to $C_{20}$ alkyl-substituted phenol in the one step or two step condensation using a formaldehyde affording reactant provides as a bridging unit an alkyl-substituted hydroxyxylene divalent group, i.e. a group having the structure:

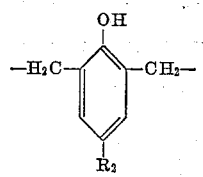

The boron-containing derivatives of the foregoing high molecular weight Mannich condensation products, as before stated, are also highly useful as high temperature in-service use function lubricating oil addition agents. These boron-containing derivatives that have a B/N ratio of 0.1 to 4.0 can be made as condensation products of (1) those high molecular weight Mannich condensation products and (2) a boron compound reactive and/or coordinatable with a polar group such as a hydroxy group and/or a nitrogen-containing group present in the Mannich condensation products. Boron compounds having that property of reaction and/or coordination include boron oxide, boron oxide hydrate, boron trifluoride, boron tribromide, boron trichloride, $HBF_4$, boron acids such as boronic acid (e.g., alkyl-$B(OH)_2$ or aryl-$B(OH)_2$, boric acid (i.e., $H_3BO_3$), tetraboric acid (i.e., $H_2B_4O_7$), metaboric acid (i.e., $HBO_2$), amides of such boron acids, and esters of such boron acids. The use of boric acid as the reactant to introduce boron into the high molecular weight Mannich condensation products is preferred. The manner of using such boron reactants with nitrogen-containing compounds in general is known and is disclosed for example in U.S. Pats. No. 3,000,916 and No. 3,087,936 among others. The preparation and use of those boron-containing derivatives of the high molecular weight Mannich condensation products of this invention are the subject of our copending application filed Apr. 14, 1969 as Ser. No. 816,125. As mentioned before the high molecular weight Mannich condensation products of this invention are exceptionally useful addition agents for lubricating oil imparting thereto dispersant-detergent and anti-oxidant properties at relatively low concentrations of the addition agents, e.g. 0.05 to 10 weight percent in formulated crankcase lubricating oil. Higher concentrations of those addition agents, e.g. upward from 10 to 70 weight percent are useful concentrates for the preparation of those formulated crankcase lubricating oils and the fortification of crankcase oil in use prior to scheduled complete drain and replacement of crankcase oil. In contrast, the prior known low molecular weight Mannich condensation products derived solely from low molecular weight alkyl substituted hydroxyaromatic compounds whose alkyl groups contain 2 to 20 carbon atoms are wholly unacceptable as dispersant-detergent addition agents for crankcase lubricating oils.

Illustration of the foregoing superiority of the high molecular weight Mannich condensation products of this invention over the prior art low molecular weight Mannich condensation products can be made by consideration of their abilities to prevent sludge and varnish deposition in standardized, industry accepted engine tests. To be acceptable dispersant-detergent addition agents for such in-service use in present-day engines, the addition agents must provide dispersancy-detergency functions in those tests so that at the end of the engine test upon inspection of disassembled engine parts they provide over-all sludge and varnish deposit ratings of 40 and over. Those ratings are determined on a 0–50 scale where a rating of 50 for each of sludge and varnish means a clean engine free from detectable sludge and varnish. The low molecular weight prior art Mannich condensation products used in crankcase lubricating oils as the sole source of dispersant-detergent addition agent at maximum concentration levels at which they can be incorporated in lubricating oil cannot provide acceptable sludge or varnish ratings when used in a standardized engine test. However, the high molecular weight Mannich condensation products of this invention used as the sole dispersant-detergent addition agent in lubricating oils suitably in the range of 0.05–10 and preferably 0.5–5.0, weight percent provide crankcase lubricating oils that in the same standardized engine tests give sludge and varnish ratings of 40 and over, even up to 45 to 49.5.

EMBODIMENT OF THE INVENTION

Representative high molecular weight Mannich condensation products contemplated by this invention can be prepared from the following representative reactants of the classes before defined.

(1) High molecular weight alkyl-substituted hydroxyaromatics

Representative of these high molecular weight alkyl-substituted hydroxyaromatic compounds are preferably high molecular weight monoalkyl-substituted phenols such as polypropylphenol, polybutylphenol, polyamylphenol and other polyalkyl phenols obtained by the alkylation of phenol with polypropylene, polybutylene, polyamylene and the like to give the suitable $C_{40}$ to $C_{20,000}$ monoalkyl substituent on the benzene ring of phenol. Desirably these monoalkyl-substituted phenols have a number average molecular weight of from 600 to 3000 and preferably have a number average molecular weight of 800 to 2500.

The $C_{40}$ and higher high molecular weight alkyl substituents on the hydroxyaromatic compounds can be derived from the appropriate polypropylenes, polybutenes, copolymers or propylene with monomers copolymerizable therewith wherein the copolymer molecule contains at least 90% propylene units, copolymers of butenes (butene-1, butene-2 and isobutylene) with monomers copolymerizable therewith wherein the copolymer molecule contains at least 90% butene units. Said monomers copolymerizable with propylene or said butenes need not be hydrocarbon monomers for they can contain polar groups such as chloro, bromo, keto, ethereal, aldehyde and other polar groups. The comonomer polymerized with propylene or said butenes need not be aliphatic and can also contain non-aliphatic groups such as in styrene, α-methyl styrene, α,p-dimethyl styrene, divinyl benzene and the like. From the foregoing limitations (90% propylene or butene units) placed on the comonomer (up to 10%) copolymerized with propylene or said butenes, it is abundantly clear that said polymers and copolymers of propylene and said butenes are substantially aliphatic hydrocarbon polymers. Thus the resulting monoalkylated phenols have $C_{40}$ and higher carbon content alkyl-substituent groups which are substantially alkyl in nature.

In lieu of those preferred polyalkyl phenols there also can be used similarly high molecular weight substituted derivatives of resorcinol, hydroquinone, catechol, cresol, xylenol, amylphenol, hydroxybiphenyl, benzylphenol, phenethylphenol, phenol resins, methylhydroxybiphenyl, guaiacol, alpha and beta naphthol, alpha and beta methylnaphthol, tolylnaphthol, xylylnaphthol, benzylnaphthol, anthrol, phenylmethylnaphthol, phenanthrol, monomethyl ester of catechol, phenoxyphenol, chlorophenol and hydroxyphenol sulfide among others. Preferred for the preparation of the before mentioned methylene linked bis-high molecular weight Mannich condensation products are high molecular weight monopolypropylphenol and monopolybutylphenol reactants which have a number average molecular weight desirably from 600 to 3000 and most preferably from 800 to 2500.

Amine reactant

Representative of this class of reactants are those having two primary amino groups. These reactants include diamino alkanes and arenes as well as alkylene polyamines. Illustrative of the diamino alkanes are alpha, omega, diamino, alkane, propanes, butanes, pentanes, hexanes, heptanes, octanes, decanes, dodecanes and the like. Illustrative of the diamino arenes are o-, m- and p-phenylene diamines, diamino naphthalenes, diamino toluenes, diamino xylylenes, p-amino-benzylamine and the like.

Suitable alkylene polyamine reactants include ethylendiamine, diethylene triamine, triethylene tetramine, tetraethylene pentamine (TEPA), pentaethylene hexamine, hexaethylene heptamine, heptaethylene octamine, octaethylene nonamine, nonaethylene decamine and decaethylene undecamine and mixtures of such amines having nitrogen contents corresponding to the alkylene polyamines having the before mentioned formula $$H_2N-(A-NH-)_nH$$

wherein A is divalent ethylene and $n$ is 3 to 10. Corresponding propylene polyamines (wherein A is the divalent propylene: $-CH_2CH_2CH_2-$) as in propylene diamine and di-, tri-, tetra-, penta-propylene tri-, tetra-, penta- and hexa-amines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloro alkanes having 2 to 6 carbon atoms and the chlorines on different carbons are suitable alkylene polyamine reactants.

Also suitable amine-type reactants are condensation products of urea or thiourea and the alkylene polyamines wherein for each X moles of urea or thiourea 2X moles of the alkylene polyamine are used. Such a condensation product from two moles of alkylene polyamine and one mole of urea has the formula:

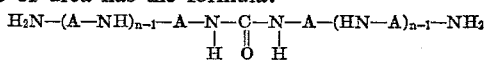

and are hereinafter called polyamino ureas.

ALDEHYDE REACTANTS

Representative aldehyde reactants contemplated for use in the preparation of the high molecular weight Mannich condensation products of this invention include the aliphatic aldehydes such as, the preferred formaldehyde yielding compounds before mentioned, acetaldehyde, cyclohexane carboxaldehyde and benzylaldehyde; aromatic aldehydes such as benzaldehyde; heterocyclic aldehydes such as furfural, and others. However, we prefer a formaldehyde yielding reactant specifically formalin for the one step condensation and formalin for the first step and paraformaldehyde for the second step in the two step condensation preparation.

The present invention is not predicated on the fact that the $C_{40}$ and above alkyl substituents in the inventive Mannich condensation products make them more oil-soluble than the $C_2$ to $C_{20}$ type prior art Mannich condensation products. But rather invention is predicated on the fact that those higher molecular weight, $C_{40}$ to $C_{20,000}$ alkyl substituents and the bridging $C_2$ to $C_{20}$ alkyl-substituted hydroxyxylylene group make the inventive product, the high molecular weight Mannich condensation products, and their boron-containing derivatives superior dispersant-detergent addition agents especially for high temperature function.

Since the products of this invention are ultimately for use in preparing lubricant oil formulations, it is advantageous to use light mineral oil, e.g. from white mineral oils to solvent extracted SAE 10 grade oils, as the reaction solvent. The high molecular weight Mannich condensation products of this invention are then obtained as solutes in concentrations of 40 to 70 weight percent in said mineral oil solvents. This is readily accomplished by using oil solutions of the $C_{40}$ and higher carbon content alkyl-substituted phenol reactant dissolved in light mineral oil of from white mineral oil to SAE 10 grade oil in the first condensation.

As mentioned before the Mannich condensation products obtained from the two step condensation are products that are likely mixtures having the $C_2$ to $C_{20}$ alkyl substituted hydroxyxylylene coupling of which the following are illustrative of two different species:

Formula (I): Tail-to-Head-to-Tail

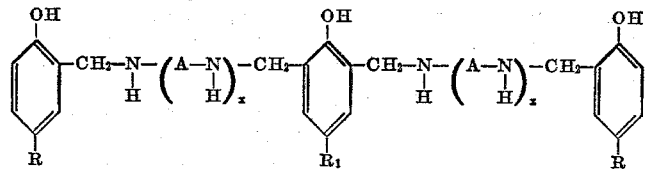

Formula (II): Tail-to-Head-to-Tail

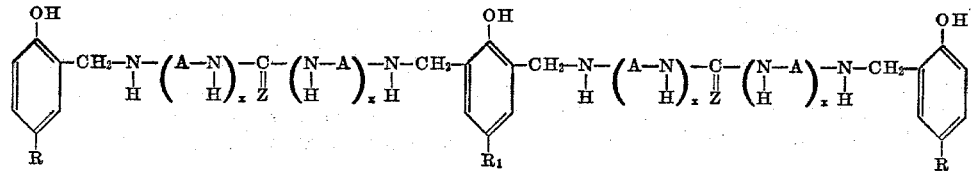

wherein A is a saturated divalent alkylene hydrocarbon group of 2 to 8 carbon atoms, $x$ is 1 to 10, Z is oxygen or sulfur, R is an alkyl hydrocarbon group of from 40 to 20,000 carbon atoms, and $R_1$ is an alkyl hydrocarbon group of from 2 to 20,000 carbon atoms.

EXAMPLE 1

There are combined, stirred and heated to 170° F., 630 grams solvent extracted SAE 5 oil. 0.29 mole TEPA (tetraethylene pentamine) and 700 grams of 1836 NAMW polybutylphenol (alkyl group from polybutene of 124 average carbons) to provide 0.29 mole of alkylphenol. Thereafter 0.29 mole formaldehyde is added, the liquid mixture is stirred and held at 320° F., held at 320° F. for two hours while injecting nitrogen at 2 c.f.h. Then 0.15 mole of p-nonylphenol is added, the resulting mixture stirred and cooled to 180° F. and a second addition of 0.29 mole formaldehyde is made. The resulting liquid mixture is stirred and heated to 340° F., held at 340° F. for 2 hours while injecting nitrogen at 2 c.f.h. The resulting liquid solution is filtered. The filtrate is a bright clear liquid having a 210° F. viscosity of 1018 SSU and is found by analysis to contain 1.4% nitrogen by weight and have a 33.02 TBN. The solute dissolved in the SAE 5W solvent extracted oil has the structure of Formula I where $C_{124}$ alkyl is substituted for each R, $C_9$ alkyl is substituted for $R_1$, $C_2H_4NH$ is substituted for each $(A-NH)_n$ and $n$ is 4 and thus is of the type of 2 mole $C_{50+}$ alkylphenol:2 mole TEPA:1 mole $C_9$ alkylphenol:4 mole $CH_2O$ substituted amine comprising products of this invention.

EXAMPLE 2

In this preparation, poly TEPA urea, i.e. the compound

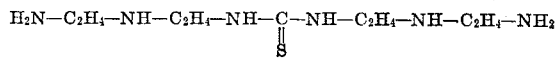

derived by reacting 2 moles TEPA with one mole urea to split out two moles ammonia is employed in place of TEPA of Example 1. There is employed 0.031 mole of said bis-carbamide of TEPA, 0.031 mole of 1713 NAMW polybutylphenol (alkyl group from polybutene) dissolved in SAE 5W oil (143 grams of solution) and a 0.031 mole portion of $CH_2O$ added at 180° F. with heating to 300° F. for 90 minutes and 1.5 c.f.h. nitrogen injection. The resulting liquid product is reacted with 0.015 mole p-dodecylphenol and 0.03 mole of formaldehyde supplied by paraformaldehyde. The filtrate is a solution of the 2 mole-NAMW alkylphenol:2 mole poly TEPA urea:1.0 mole dodecylphenol:4 mole $CH_2O$ mole ratio substituted amine of the structure of Formula II where $C_{115}$ alkyl is substituted for each R, $C_{12}$ is substituted for $R_1$, $(HNC_2H_4)_4$ is substituted for each $(A-NH)_x$ and Z is oxygen.

EXAMPLE 3

As an example of a sulfur-containing dispersant-detergent oxidation inhibiting compound of this invention, there are reacted 0.32 mole of thiourea and 0.64 mole of diethylene triamine to produce 0.32 mole of the thiourea having the formula:

$$H_2N-C_2H_4-NH-C_2H_4-NH-\underset{\underset{S}{\|}}{C}-NH-C_2H_4-NH-C_2H_4-NH_2$$

under conditions splitting out two moles ammonia. Then 0.32 mole of this bis-thiocarbamide is combined with 1088 grams of 1836 NAMW $C_{124}$ alkylphenol (described in Example 1) dissolved in 1000 grams of white oil to provide 0.32 mole of $C_{124}$ alkylphenol. After stirring and heating this mixture to 140° F. there is added 0.32 mole formaldehyde, this mixture is heated to 340° F., held at 340° F. while injecting 2.2 c.f.h. nitrogen for 75-80 minutes, cooled to 300° F., and reacted with an additional 0.32 mole $CH_2O$ supplied by paraformaldehyde and 0.16 mole of $C_{20}$ alkylphenol (wax phenol). The resulting liquid is stirred and heated at 300° F. and nitrogen at 2.2 c.f.h. is injected for 2 hours. The resulting mixture is filtered. The filtrate is a solution of one of the inventive compounds of Formula II wherein R is $C_{124}$, $R_1$ is $C_{20}$, Z is sulfur, A is $C_2H_4NH$ and each $n$ is 4.

The detergency-dispersancy activity of the products of Examples 2 and 3 exceeds that of corresponding products prepared from TEPA or diethylene triamine (DETA) by more than the mere difference in nitrogen atom content might suggest. It will be appreciated that bis-carbamide (0.29 mole) derived from DETA can be used in place of 0.29 mole TEPA with the 0.29 mole $C_{124}$ alkylphenol and 0.15 mole p-nonylphenol and two 0.29 mole portions formaldehyde in the process of Example 2 to produce a related product as solute in SAE 5 oil wherein said solute there are present two

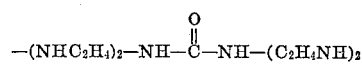

moieties in place of the two TEPA moieties shown in the 1-hydroxy - 4 - nonyl-m-xylyl-$N_5$,$N'5$-bis($N_1$-3-$C_{124}$-alkyl-6-hydroxy benzyl TEPA).

An amount of the product of Example 1 containing 0.56 grams of the disubstituted amine shown is added to a measured volume of crankcase lubricant oil formulation which had been used in a Lincoln Sequence V Engine Test for 384 hours (twice the time of the standard test time). To the same volume of used crankcase oil from the same 394 hour Lincoln Sequence V engine test there is added 0.5 grams $N_1$,$N_5$-bis(polybutenyl-succinimide) of tetraethylene pentamine (bis-succinimide) whose polybutenyl group has a molecular weight of about 860. These two compositions are heated and stirred at 300° F. for 16 hours and an aliquot of each is transferred to blotting paper. A control is made at the same time by stirring and heating at 300° F. for 16 hours a third volume of used oil from the 394 hour Lincoln Sequence V Engine Test and depositing an aliquot on blotting paper. The deposits on the blotting paper are measured to obtain the average diameter of the outer oil ring (Do) and the average diameter of the inner sludge ring (Ds). The ratio of $Ds/Do$ is an indication of the detergent-dispersant property of the addition agent. These ratios are shown in Table I.

TABLE I
Used Lincoln Sequence V Oil—394 Hours

| Test | Addition agent | Ratio $Ds/Do$ (X100) |
|---|---|---|
| 1—control | No | ca. 60 |
| 2 | Example 1 (0.56 gram) | 93.8 |
| 3 | Bis succinimide (0.5 gram) | 82.5 |

The same test procedure conducted with Mannich condensation products of $C_2$ to $C_{20}$ alkyl-substituted phenol as the sole phenol, typical of prior art products, made for example from the respective molar ratio of 2 moles nonylphenol:1 mole TEPA and 2 moles formaldehyde do not have sufficient dispersancy-detergency properties required to disperse sludge and hence show little or no improvement over the control.

EXAMPLE 4

The use of high molecular weight alkyl-substituted phenol and low molecular weight alkyl-substituted phenol in a one step Mannich condensation reaction is conducted in the following manner. There are combined, stirred and heated to 180° F., 200 grams of the oil solution (83%) of the polypropyl-substituted phenol (0.186 mole) of 892 NAMW, 123 grams (0.0558 mole) of nonylphenol and 35 milliliters (0.186 mole) of tetraethylene pentamine. To this mixture there is added 60 milliliters of formalin (37% $CH_2O$) to provide 0.744 mole formaldehyde. The resulting mixture is heated first to 320° F. and then held at 280–300° F. for four hours to remove by-product water.

The resulting oil solution is deep red in color, has a nitrogen content of 2.97 and an oxygen content of 4.13%. The molecular weight (NAMW) of the dissolved high molecular weight Mannich condensation product is 1339.

EXAMPLE 5

There are combined, stirred and heated to 300° F., 100 grams (0.093 mole) of the oil solution (83%) of polypropyl-substituted phenol (892 NAMW), 0.093 mole nonylphenol and 0.093 mole of hydrazine hydrate. To this stirred mixture there is added 15 milliliters of formalin (37% $CH_2O$) to provide 0.186 mole formaldehyde. The mixture is maintained at 300° F. for 20 hours. The dried product is dark in color and is an oil solution of high molecular weight Mannich condensation product of hydrazine as the >NH compound reactant.

EXAMPLE 6

A high molecular weight (1554 NAMW) Mannich condensation product is prepared from 200 grams of the oil solution (83%) of polypropyl-substituted phenol (892 NAMW), 0.186 mole of nonylphenol, 0.093 mole tetraethylene pentamine and 0.372 mole of formaldehyde. The dried product, an oil solution of 1554 NAMW high molecular weight Mannich condensation product, has a nitrogen content of 2.01% and an oxygen content of 3.50%. This product when used in a carbon black suspension test (4 grams of lamp black in 90 ml. naphtha) provided a stable suspension for at least 24 hours.

ENGINE TESTS

The effectiveness of the substituted amine products of this invention as detergent-dispersant addition agent for lubricant oil compositions can be demonstrated by their use in such compositions as crankcase lubricants in actual enginge tests such as the Lincoln Sequence V Engine Test, the Ford 289 Engine Test and the L–38 Engine Test aforementioned.

It will be noted that the hydroxyalkyl benzyl substituted amine products of this invention used in said tests unlike hydroxyalkyl benzyl substituted amines of the prior art are not used as their calcium, barium, magnesium or other alkaline earth metal or alkali metal salts.

The compounds of this invention can function as detergent-dispersant addition agents in lubricant oil compositions in the weight perecnt range suitably of from 0.1 to 10%, desirably in the range of 0.2 to 8.0% and preferably in the range of 0.5 to 5%. However, lubricant oil solutions having 10 to 50% or more by weight of the novel hydroxalkyl benzyl substituted polyalkylene amines of this invention including the bis(polyalkylene amine) carbamides and thiocarbamides are useful in the preparation of finished lubricant oil compositions because they can be readily and conveniently combined with concentrates of other lubricant oil addition agents such as oil solutions of the alkaline earth metal sulfonates, e.g. normal and high based calcium and magnesium salts of petroleum sulfonic acids such as sour oil, mahogony acid and alkyl substituted benzene sulfonic acids having alkyl hydrocarbon groups of a carbon content of greater than 16 and more specifically of 30 to 20,000 carbon atom alkyl hydrocarbon group size, oil solutions of zinc dialkyldithiophosphates and other concentrate solutions of lubricant addition agents all of which are used for their anti-wear, anti-corrosition, anti-foam, oxidation inhibition, oiliness, viscosity-index improving properties. For example, the oil solution concentrates having 10 to 50% by weight of the novel substituted amine products of this invention can be easily blend mixed with base oils and oil solution concentrates of the aforementioned addition agents having anti-wear, anti-corrosion, viscosity-index improving, anti-foam, etc. properties in transfer line blending, i.e. each concentrate and base oil are charged to a transfer line from sources of supply of each concentrate in the required proportions so that there flows from the transfer line a completely finished, fully formulated lubricant oil composition ready for packaging in quart, gallon, 5 quart, 30 gallon or 55 gallon containers or tank car and/or truck for delivery to the ultimate consumer. Such finished and fully formulated lubricant oil compositions are useful as crankcase lubricants for automobile, truck and railway gasoline and/or diesel engines.

The aforementioned Lincoln Sequence V Engine Test, Ford 289 Engine Test and L–38 Engine Test are conducted in the following manner.

LINCOLN SEQUENCE V ENGINE TEST

Briefly, this test designed to evaluate dispersancy characteristics of formulated lubricant oils consists of using the oil to be tested as a lubricating oil in a V–8 Lincoln Engine under prescribed test conditions. Accordingly, five quarts of oil are placed in the crankcase and the engine is started and run in accordance with the four hour cycle:

|  | Phase 1 | Phase 2 | Phase 3 |
| --- | --- | --- | --- |
| Duration | 45 minutes | 2 hours | 75 minutes. |
| Speed, r.p.m. | 500 | 2,500 | 2,500. |
| Load, lbs. | No load | —(105 HP.) | —(105 HP.). |
| Temperature, ° F.: |  |  |  |
| Water out | 115–120 | 125–130 | 170–175. |
| Oil sump | 120–125 | 175–180 | 205–210. |
| A/F | 9.5±0.5 | 15.5±0.5 | 15.5±0.5. |

The four-hour cycle is reset a total of 48 times (192 hours running time). After each 16 hours of operation the engine is shut down for 8 hours. Two-ounce samples of oil are taken every 30 hours and the oil level is adjusted with fresh oil to a level of five quarts. Added oil is weighed. At the time of the test, the hot oil is drained, weighed and recorded. The engine is then disassembled and tested for deposits of varnish and sludge among other observable results as set out in the table supra. Engine components are examined visually and rated on a scale of 1 to 10, 10 being a perfect reading indicating no sludge or varnish. A rating of 50 for total sludge and for total varnish is considered perfect; a rating of 60 percent or lower is considered passing for screen clogging; and a rating of 50 percent or lower is considered passing for ring plugging.

Ford–289 engine test

The Ford 289 cubic inch displacement engine test, hereinafter designated as "F–289 Test," is conducted in the same manner as the Lincoln Test Sequence V except for the apparent difference in test engines. This F–289 Test is more severe with respect to both sludge and varnish formation and deposition. Also the F–289 Test is conducted with vapors from the crankcase being introduced into the engine fuel intake system by means of a positive crankcase ventilation system which, in part, results in the more severe sludge and varnish formation during test operation.

The compositions of Examples 1 through 6 when used in lubricant oil formulations in amounts to provide 1.0 to 2.1 weight percent of the high molecular weight Mannich condensation product (2.5 to 5 volume percent of the solution of the condensation product in oil) together with 0.6 to 1.0 weight percent zinc dialkyldithiophosphate and about 1.0 percent 300 total base number calcium or magnesium sulfonates will give 40 to 50 total sludge ratings and 40 to 43 total varnish ratings in the Ford–289 Engine Test and 40 to 50 total sludge ratings and 30 to 48 total varnish ratings in the Lincoln Sequence V Engine Test.

Another industry accepted standardized test used to rate additives, especially detergent-dispersant additives, against high temperature performance is the Caterpillar 1–H Test. In this Engine Test there was little or no piston skirt deposit when a product such as illustrated by Examples 1 to 6 is used as the lubricant oil detergent at a concentration of 1 to 2 weight percent (2.5 to 5 volume percent) of the condensation product (or oil solution).

We claim:

1. The composition comprising a light mineral oil having dissolved therein in a concentration of 40 to 70 weight percent the Mannich Reaction product prepared in the presence of said mineral oil as reaction solvent by condensation under conditions of the Mannich Reaction of the reactants: (1) high molecular weight mono-alkyl-substituted phenol where in said alkyl substituent has from 40 to 20,000 carbon atoms, (2) lower molecular weight alkyl-substituted phenol whose alkyl substituent has from 2 to 20 carbon atoms, (3) ethylene polyamine having the formula

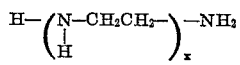

wherein $x$ is an integer from 1 to 10, and (4) one of formaldehyde, formalin, paraformaldehyde or trioxymethylene used in the respective molar ratio of reactants of 2.0:0.7–1.0:1.4–2.0:2.8–b.0; wherein said four reactants are condensed in the presence of said oil solvent in a single Mannich Reaction or in two Mannich Reactions in which the first Mannich Reaction employs reactants (1), (3) and (4) in the respective molar ratio of reactants of 1.0:0.7–1.0:0.7–1.0 in said oil solvent and the second Mannich Reaction employs for each 2 moles of moles of said first reaction product in said oil solvent from 0.7 to 1.0 mole of reactant (2) and from 1.4 to 2.0 moles of reactant (4); and wherein said oil solvent is used in an amount with respect to said reactants to obtain the dissolved final Mannich Reaction product in said concentration of 40 to 70 weight percent.

2. The composition of claim 1 wherein the alkyl substituent of reactant (1) is polypropyl or polybutyl of 800–2500 number average molecular weight, reactant (2) is nonylphenol and reactant (4) is formaldehyde.

3. The product of claim 2 wherein the alkyl-substituent of reactant (1) is a polybutyl-substituent.

4. The product of claim 2 wherein the alkyl-substituent of reactant (1) is a polypropyl-substituent.

5. The product of claim 2 wherein polyamine reactant (3) is tetraethylene pentamine.

References Cited

UNITED STATES PATENTS 3,539,633  11/1970  Piasek et al. _____ 260—570.5
3,368,972   2/1968  Otto _____ 252—47.5

LEWIS GOTTS, Primary Examiner

C. F. WARREN, Assistant Examiner

U.S. Cl. X.R.

252—49.6, 47.5, 51.5 R, 51.5 A; 260—462 R, 502.3, 551 B, 552 R, 553 R, 553 D, 570.9